(12) United States Patent
Ghisolfi

(10) Patent No.: US 7,182,985 B1
(45) Date of Patent: Feb. 27, 2007

(54) RECYCLABLE MULTI-LAYER MATERIAL OF POLYESTER RESIN

(75) Inventor: Guido Ghisolfi, Tortona (IT)

(73) Assignee: COBARR, S.p.A., Anagni (IT)

( * ) Notice: Subject to any disclaimer, the term of this patent is extended or adjusted under 35 U.S.C. 154(b) by 0 days.

(21) Appl. No.: 09/334,891

(22) Filed: Jun. 17, 1999

(51) Int. Cl.
  *B32B 1/00* (2006.01)
  *B32B 1/02* (2006.01)

(52) U.S. Cl. .................... 428/35.7; 428/34.2; 428/35.7; 428/35.9; 428/36.5; 428/446; 428/480; 428/481

(58) Field of Classification Search ............... 428/34.2, 428/36.5, 480, 481, 35.7, 35.9, 446
See application file for complete search history.

(56) References Cited

U.S. PATENT DOCUMENTS

| | | | |
|---|---|---|---|
| 2,961,418 A | | 11/1960 | Wilson et al. |
| 3,170,832 A | * | 2/1965 | Shuffman et al. ........... 428/159 |
| RE28,554 E | * | 9/1975 | Curler et al. ................ 428/334 |
| 4,543,364 A | * | 9/1985 | Nankee et al. ................ 521/40 |
| 4,806,398 A | * | 2/1989 | Martin, Jr. .................. 428/34.2 |
| 5,000,991 A | * | 3/1991 | Hayashi et al. ............. 428/36.5 |
| 5,232,786 A | * | 8/1993 | Waters et al. ............. 428/475.8 |
| 5,300,748 A | * | 4/1994 | Colombo .................... 219/734 |
| 5,508,075 A | * | 4/1996 | Roulin ...................... 428/35.7 |
| 5,681,865 A | * | 10/1997 | Harfmann ..................... 521/79 |
| 5,882,798 A | * | 3/1999 | Hubbard et al. ............. 428/446 |
| 5,972,445 A | * | 10/1999 | Kimura et al. ............. 428/35.4 |

FOREIGN PATENT DOCUMENTS

| | | | |
|---|---|---|---|
| EP | 0232818 | * | 8/1987 |
| JP | 05050550 | * | 8/1991 |
| JP | 07156980 | * | 6/1995 |
| JP | 09039185 | * | 2/1997 |

OTHER PUBLICATIONS

The Encyclopedia of Polymer Science and Engineering, vol. 12, p. 214, 1985.*
Database WPI—Section Ch, Week 199436- Derwent Publications Ltd., London,GB, Class A23, AN 1994-291001—X002160826 & JP 06 220237A (KANEBO Ltd), Aug. 9, 1994 *abstract*.
Patent Abstract of Japan, vol. 018, No. 502 (M-1676) Sep. 20, 1994 & JP 06 170999A (KANEBO Ltd), Jun. 21, 1994 *abstract*.

* cited by examiner

*Primary Examiner*—Marc A. Patterson
(74) *Attorney, Agent, or Firm*—Edwin A. Sisson; Alvin T. Rockhill

(57) ABSTRACT

Recyclable multi-layer material of polyester resin suitable for the production of beverage and food containers comprising a layer of foam in polyester resin with density lower than 700 kg/m³, and a film of polyester resin adhered to the foamed sheet. On the multi-layer material a pattern is creased according to which by folding it is possible to develop the shape of a container.

6 Claims, No Drawings

RECYCLABLE MULTI-LAYER MATERIAL OF POLYESTER RESIN

The present invention refers to a recyclable multi-layer material of polyester resin, suitable for the production of containers for beverages and foods on which it is stamped by pressing a pattern according to which by folding, the shape of a container is obtainable. The material is heat-sealable and permits the closure of the container by heat-sealing.

The invention refers in particular to a material having gas barrier properties suitable for the production of containers for beverages such as fruit juices, medium shelf-life milk, tea and similar.

The invention also includes the containers obtained from the multi-layer material.

BACKGROUND OF THE INVENTION

The multi-layer material employed till now for the preparation of containers for beverages and foods such as fruit juices, milk or other, includes essentially a functional layer of cardboard which gives to the container mechanical properties, in particular rigidity, and, adhered to the cardboard, in some cases, a layer of a thin sheet of aluminum which is coated on the side which comes into contact with the beverage or food, with a polyethylene film or similar polymeric material.

Containers produced with such multi-layer materials are difficult to recycle due to the different chemical nature of the various layers.

The recyclability of the material forming a container for foods or beverages is a very important requisite both from the point of view of savings that recycling allows to be obtained and from an ecological aspect.

The possibility of having a recyclable material is a very important topic in the field.

Containers for beverages and liquids produced of polymeric materials exist but do not present characteristics of rigidity comparable to those of cardboard and for this reason they do not result in being suitable to produce rigid containers. The containers obtained with such materials come into the category of small sacks (pouches).

The attempt to obtain containers with the necessary rigidity using polymeric materials has failed until now.

The rigidity in the containers is in function of the thickness of the wall and more precisely varies with the cube of the wall thickness.

The use of polymeric materials such as polyolefins for the production of containers having sufficient rigidity would imply a thickness which is not economical and furthermore is not processable due to the difficulty in folding and sealing that is encountered in the phase of closing the container.

Another material such as foamed polystyrene is not employable due to its fragility when it is conformed into thin layers.

From the patent literature (U.S. Pat. No. 5,000,991) rigid laminates are known which are utilized for the preparation of thermoformed containers for victuals, formed of a sheet of foamed polyester material and a film of the same nature as the sheet, or of other polymeric material. Known from EB-A-836937 are semi-rigid laminates having a thickness of 0.5 to 1.5 mm and comprising a layer in polyester resin foam having density of 0.7 to 1 $g/cm^3$ on which a layer of polymeric material having gas barrier properties, different from that of the layer in polyester foam, is adhered.

The laminates are utilized for the preparation by thermoformation of articles for packaging.

Mono and multi-layer materials comprising a layer of polymeric foam capable of being creased to form, by folding according to the pattern pressed on the material, the shape of the container, are not known in patent literature.

The capability of a polymeric foamed material, mono layer or multi-layer, to be pressed with a pattern set to develop by folding the shape of a container, and the foldability of the material according to such a pattern, constitute indispensable requirements for the production of containers for beverages and foods when using the creasing and folding technique.

A material is suitable for creasing if the pattern pressed on it remains stable over time and if in the stamping of such pattern there is no breakage which could impair the possibility of folding the material.

Moreover the material must be heat-sealable to render possible the closure of the container.

SUMMARY OF THE INVENTION

It has now unexpectedly been found a recyclable multi-layer polymeric material formed of layers of polymeric material substantially of the same chemical nature, having sufficient rigidity to substitute cardboard, capable of being creased and folded according to a pattern stamped on it and furthermore being heat-sealable.

The multi-layered material of the present invention is a material that comprises as essential layers a foamed sheet of polyester resin with density lower than 700 $kg/m^3$ and, adhered to said sheet, a heat-sealable film of polyester resin capable of realizing by heat-sealing the closure of the container.

DETAILED DESCRIPTION OF THE INVENTION

The polyester film is adhered to the foam sheet with any procedure suitable to realize adhesion between the materials, for example by hot lamination or gluing with polyester resin based glues.

The foamed material of the present invention comprises, or is made of, a substantially amorphous (containing less than 15% crystallinity) foamed sheet obtained from a polyester resin. The density of the sheet is preferably from 10 and 500 kg/m3, most preferably from 100 and 200 kg/m3. The thickness of the sheet is generally from 0.2 mm and 3 mm, most preferably between 0.2 and 1.5 mm.

The preparation of the sheet is carried out according to conventional extrusion-expansion methods.

A preferred method is that described in U.S. Pat. No. 5,362,763, which is herewith incorporated by reference.

Other methods are those described in U.S. Pat. No. 5,362,763, which is also incorporated by reference.

The rigidity of the sheet is in function of the thickness of the same: it increases (not proportionally) with the thickness. The use of reinforcing fillers such as silica, alumina, titanium dioxide, calcium carbonate increases the rigidity of the sheet.

The polyester film is obtained from low melting polyesters able to permit the closure of the container by heat-sealing. The melting point of these polyesters is generally from 50° to 200° C., most preferably between 80° and 120° C. Examples of polyesters are copolyethylene terephthalates in which more than 10% of units deriving from terephthalic acid are substituted by units deriving from isophthalic acid or its mixtures with other bicarboxylic acids such as naphthalene bicarboxylic acids.

Preferably the polyester film is a coextruded dual layer film in which one layer is formed by a heat-sealable low melting copolyester and the other layer a conventional type polyester such as PET or copolyesters with a melting point higher than 200° C. The use of the dual layer film permits to realize the closure of the container by sealing in a very simple and effective way.

An example of a usable dual layer film is TERPHANE film from Toray Plastics Europe S.A. (TERPHANE is a registered trademark of Toray Plastics Europe).

The dual layer film as well as the mono layered film generally has a thickness from 10 to 25 micron.

In containers, the polyester film represents the layer that comes into contact with the liquid or food, and which prevents the leakage of beverage or loss of flavour from the container.

Furthermore, for machinability reasons in the packaging phase, the polyester film can be applied on both sides of the foamed sheet.

To improve the gas barrier properties of the polyester film, the same is subjected to a surface treatment giving it barrier properties or materials with barrier properties such as aluminum and oxides of aluminum and silicon ($Al_2O_3$ and $SiO_x$) are applied.

A representative surface treatment is the lacquering of the film with a layer of lithium or potassium polysilicate. The treatment permits to realize a very slow oxygen permeability rate that can reach 0.3 ml/m$^2$/24 h/atm or less.

The application of a layer of aluminum and Al and/or Si oxides is made according to known methods.

The surface treatment and the application of barrier materials are chosen and conducted in such a way that the polyester film is able to realize oxygen permeation rate lower than 70 ml/m$^2$/24 h/atm (ASTM 1434).

In the case of a film metallized with Al or coated with Al and/or Si oxides, the oxygen permeation rate can decrease to values lower than 0.3 ml/m$^2$/24 h/atm. Values lower than 10 ml/m$^2$/24 h/atm are preferred.

The layer of aluminum or of other material applied on the film represents in any case a percentage by weight with respect to the weight of the film so small that the metallized film is considered in recycling as formed with only polyester.

The thickness of the film having barrier properties is generally from 12 to 36 micron.

As already indicated, the polyester film is the side of the containers that comes into contact with the beverage or food: in the case of a film treated to improve the barrier properties, the untreated side is that which comes into contact with the beverage or food.

It is also possible, and this in function of the various requirements, such as for example printing with inks or other, to place the treated film as the external layer and having the foamed sheet onto which the film is adhered as the internal layer.

Also in this case, the untreated film is that which comes into contact with the beverage or food.

Examples of polyester film metallized with aluminum are obtainable on the market under the name of Nu Roll of Nuroll S.p.A. (Nu roll is a registered trademark of Nuroll S.p.A.).

The production of the containers is realized by folding the multi-layer material according to a pattern pressed on the sheet by creasing, set to develop the shape of the container. The containers can have different shape and volume according to their end use. Cubic, oblong or pyramidal shapes can be used. Generally the volume of the containers for beverages and fruit juices is between 0.2 and 2 liters.

The polyester utilized for the preparation of the multi-layered material is an aromatic polyester obtainable by polycondensation of an aromatic bicarboxylic acid with a diol of 2–12 carbon atoms.

The polyester used in the foam sheet is preferably selected from polyethylene terephthalates and its copolymers in which up to 20% in moles of units deriving from terephthalic acid are substituted by units deriving from isophthalic acid and/or naphthalene-dicarboxylic acid.

For the preparation of the foamed sheet as well as the film adhered on the foam sheet, recycled polyesters can be used.

EXAMPLE 1

The following examples are provided to illustrate but not limit the invention.

A PET foamed sheet, of thickness 0.7 mm and density 180 kg/m$^3$, coming from a bobbin is adhered with a polyester glue to a copolyethylene terephthalate film having units of isophthalic acid and having a melting point of 120° C.

The film, 15 micron of thickness, is metallized on one side with a layer of aluminum of about 200 Å in thickness and is adhered with the metallized side on the foamed sheet. The dual layer material thus obtained is creased to develop the shape of a container having capacity of 0.5 to 1.5 liters utilized for medium shelf life milk and fruit juices.

The container is hermetically closeable by heat-sealing. The closure is easily tear-openable.

EXAMPLE 2

A PET foamed sheet with the characteristics reported in Example 1, is adhered with the use of a polyester glue to a dual layer film TERPHANE having thickness of 15 micron.

The multi-layered material this way obtained is utilized for the production of containers for fresh milk and similar beverages by means of creasing and folding. The containers are hermetically closeable by heat-sealing and the closure is easily tear-openable.

The disclosures in Italian Patent Applications No. MI98A001463 and MI98A002078 from which this application claims priority are incorporated herein by reference.

What is claimed is:

1. A recyclable container for beverages or foods which consists of a multi-layer polyester material, wherein the multi-layer polyester material consists of (1) a layer of foamed polyester sheet having a density of lower than 700 kg/m$^3$, wherein the polyester of the foamed sheet is an aromatic polyester selected from the group consisting of polyethylene terephthalates and polyethylene terephthalate copolymers in which up to 20% of the moles derived from terephthalic acid are substituted by units deriving from isophthalic and/or naphthalene-dicarboxylic acid and said polyester of the foamed sheet has a crystallinity of lower than 15%, and (2) a heat-sealable coextruded dual layer film which is adhered to the foamed sheet, wherein the heat-sealable coextruded dual layer film consists of (i) a first layer which consists of a low melting aromatic polyester having a melting point which is within the range of 50° to 200° C. and (ii) a second layer which consists of an aromatic polyester having a melting point higher than 200° C., wherein the foamed layer and the heat sealable film are adhered together by hot lamination or by use of at least one polyester resin based glue, wherein the aromatic polyester in the first layer and the aromatic polyester in the second layer have a crystallinity of lower than 15%, and wherein the container is obtained by folding said multi-layer polyester material along lines of a pattern creased on the multi-layer polyester material.

2. A recyclable container for beverages or foods as specified in claim 1 wherein the foamed layer and the heat sealable film are adhered together by hot lamination.

3. A recyclable container for beverages or foods as specified in claim 1 wherein the foamed layer and the heat sealable film are adhered together with a polyester based glue.

4. A recyclable container for beverages or foods as specified in claim 3 wherein the aromatic polyester of the foamed sheet is comprised of a copolyethylene terephthalate containing from 2 mole percent to 20 mole percent diacid repeat units which are derived from isophthalic acid and/or naphthalene-dicarboxylic acids.

5. A recyclable container for beverages or foods as specified in claim 4 wherein the aromatic polyester of the foamed sheet has density which is within the range of 10 $kg/m^3$ to 500 $kg/m^3$.

6. A recyclable container for beverages or foods as specified in claim 5 wherein the recyclable container is entirely recyclable.

* * * * *